US012756558B2

(12) United States Patent
Dieterle

(10) Patent No.: US 12,756,558 B2
(45) Date of Patent: Oct. 6, 2026

(54) NETWORK NODE FOR FIELD DEVICE DATA

(71) Applicant: VEGA GRIESHABER KG, Wolfach (DE)

(72) Inventor: Marcel Dieterle, Schiltach (DE)

(73) Assignee: VEGA GRIESHABER KG, Wolfach (DE)

( * ) Notice: Subject to any disclaimer, the term of this patent is extended or adjusted under 35 U.S.C. 154(b) by 114 days.

(21) Appl. No.: 18/691,758

(22) PCT Filed: Sep. 13, 2022

(86) PCT No.: PCT/EP2022/075401
§ 371 (c)(1),
(2) Date: Mar. 13, 2024

(87) PCT Pub. No.: WO2023/037005
PCT Pub. Date: Mar. 16, 2023

(65) Prior Publication Data

US 2024/0430085 A1 Dec. 26, 2024

(30) Foreign Application Priority Data

Sep. 13, 2021 (DE) ..................... 10 2021 123 625.8

(51) Int. Cl.
*H04L 9/30* (2006.01)

(52) U.S. Cl.
CPC ..................................... *H04L 9/30* (2013.01)

(58) Field of Classification Search
CPC ......... H04L 9/30; H04L 9/50; H04L 2209/56; H04L 2463/102; H04L 63/0442;
(Continued)

(56) References Cited

U.S. PATENT DOCUMENTS

| | | | | |
|---|---|---|---|---|
| 10,044,687 | B2 * | 8/2018 | Fransen | H04W 4/70 |
| 11,115,218 | B2 | 9/2021 | Nixon et al. | |

(Continued)

FOREIGN PATENT DOCUMENTS

| | | | |
|---|---|---|---|
| DE | 10 2016 118 611 | A1 | 4/2018 |
| DE | 10 2016 118 615 | A1 | 4/2018 |
| DE | 10 2020 100 854 | A1 | 7/2020 |

OTHER PUBLICATIONS

Xu et al."A Blockchain-Enabled Energy-Efficient Data Collection System for UAV-Assisted IoT" [Online],Oct. 12, 2020[Retrieved on: Aug. 23,2025], IEEE IoT Journal V.8,I.4, Retrieved from: < https://ieeexplore.ieee.org/stamp/stamp.jsp?tp=&arnumber=9220772 > (Year: 2020).*

(Continued)

*Primary Examiner* — Eric W Shepperd
(74) *Attorney, Agent, or Firm* — Oblon, McClelland, Maier & Neustadt, L.L.P.

(57) ABSTRACT

A network node for a field device data network, which receives first field device data, store, the first field device data in data blocks, receives a data block request including a public key and digital monetary data, checks the digital monetary data, and if the check is successful, answers the data block request by encrypting the requested data block using the public key and transmitting the data block encrypted using the public key.

18 Claims, 3 Drawing Sheets

(58) Field of Classification Search
CPC ..... G06F 21/6218; G06F 21/64; G06Q 30/06; G06Q 2220/00
See application file for complete search history.

(56) References Cited

U.S. PATENT DOCUMENTS

| | | | | |
|---|---|---|---|---|
| 2019/0081796 | A1* | 3/2019 | Chow | G06Q 20/34 |
| 2019/0188704 | A1* | 6/2019 | Grendon | G06Q 20/223 |
| 2019/0237169 | A1* | 8/2019 | Culver | G06Q 20/38215 |
| 2019/0251296 | A1 | 8/2019 | Maneval et al. | |
| 2020/0007544 | A1* | 1/2020 | Wang | H04L 9/3297 |
| 2020/0013050 | A1* | 1/2020 | Finlow-Bates | H04L 9/3239 |
| 2020/0042989 | A1* | 2/2020 | Ramadoss | G06Q 50/167 |
| 2020/0074438 | A1* | 3/2020 | Boemi | G06Q 20/201 |
| 2020/0084027 | A1* | 3/2020 | Duchon | G06F 21/602 |
| 2020/0104913 | A1* | 4/2020 | Lawrenson | G06Q 30/0208 |
| 2020/0143367 | A1* | 5/2020 | LeBeau | G06F 21/64 |
| 2020/0151682 | A1* | 5/2020 | Hurry | G06Q 20/0655 |
| 2020/0167764 | A1* | 5/2020 | Lin | H04L 9/3239 |
| 2020/0204375 | A1* | 6/2020 | Coulmeau | H04L 9/0637 |
| 2021/0383363 | A1* | 12/2021 | Smirnov | G06Q 20/3674 |
| 2022/0270725 | A1* | 8/2022 | DeRosa-Grund | G06F 16/2365 |
| 2024/0046258 | A1* | 2/2024 | Griffin | G06Q 30/0637 |

OTHER PUBLICATIONS

Ozyilmaz et al. "IDMoB: IoT Data Marketplace on Blockchain" [Online], Nov. 8, 2018[Retrieved on: May 10, 2026], CVCBT2018, Retrieved from: < https://ieeexplore.ieee.org/stamp/stamp.jsp?tp=&arnumber=8525388 > (Year: 2018).*

Office Action issued Jun. 30, 2022, in corresponding German Patent Application No. 10 2021 123 625.8, 10 pages.

International Preliminary Report on Patentability and Written Opinion issued Mar. 5, 2024, in PCT/EP2022/075401, 8 pages.

European Office Action issued on Jun. 11, 2025, in European Application No. 22 785 709.1, 7 pages.

Li et al., "A decentralized and secure blockchain platform for open fair data trading", Concurrency and Computation: Practice and Experience, vol. 32, e5578, 2020, pp. 1-11, XP072307379.

International Search Report issued Dec. 13, 2022 in PCT/EP2022/075401, filed on Sep. 13, 2022, 3 pages.

Manzoor et al. "Proxy re-encryption enabled secure and anonymous IoT data sharing platform based on blockchain", Journal of Network and Computer Applications 176 (2021) 17 pages.

Papadodimas et al. "Implementation of smart contracts for blockchain based IoT applications", 2018 9th International Conference on the Network of the Future, 8 pages.

Farahani et al. "The convergence of IoT and distributed ledger technologies (DLT): Opportunities, challenges, and solutions", Journal of Network and Computer Applications 177 (2021) 23 pages.

* cited by examiner

NETWORK NODE FOR FIELD DEVICE DATA

REFERENCE TO RELATED APPLICATIONS

The present application claims priority from German patent application No. 10 2021 123 625.8, filed on Sep. 13, 2021, which is incorporated herein by reference in its entirety.

FIELD OF THE INVENTION

The invention relates to a network node for a field device data network, a field device data network, a user device for a field device data network, a method for transmitting a data block with field device data, and a use of a network node in a field device data network.

BACKGROUND

Data from field devices is usually sent via a network to a server, which makes the data available to a user. The user has a client that can request and retrieve the data. The data can be encrypted. Contractual matters are usually regulated and executed separately. Such a system or procedure is cumbersome and insecure despite encryption. It is not possible to retrieve data anonymously.

Therefore, one object of the invention could be to provide an improved system for providing the data of a field device to a user.

The problem is solved by the subject-matter of the independent patent claims. Advantageous embodiments are the subject of the dependent claims, the following description and the figures.

The described embodiments similarly relate to the network node for the field device data network, the field device data network, the user device for the field device data network, the method for transmitting a data block comprising field device data, and the use of a network node in a field device data network. Synergistic effects may result from various combinations of the embodiments, although they may not be described in detail.

Further, it should be noted that all embodiments of the present invention relating to a method may be carried out in the described order of steps, but this need not be the sole and essential order of steps of the method. The methods disclosed herein may be carried out with a different sequence of the disclosed steps without departing from the particular method embodiment, unless expressly stated otherwise below.

Technical terms are used with the meaning known to the person skilled in the art. If certain terms are given a specific meaning, definitions of terms are given below, in the context of which the terms are used.

According to a first aspect, a network node for a field device data network is provided, which is configured to receive first field device data, store the first field device data in data blocks, receive a data block request including a public key and digital monetary data, check the digital monetary data, and if the check is successful, respond to the data block request by encrypting the requested data block using the public key and transmitting the data block encrypted using the public key.

A field device can be, for example, a sensor or a measuring device that records environmental data and sends or can send data to a server, a data network, a cloud, etc. regularly or at least several times. The field device can be used in an industrial or public environment. For example, the sensor is a radar sensor, an ultrasonic sensor, a pressure sensor, a point level sensor, a vibration limit switch, etc. A field device can also be an actuator that transmits its status or operating data, for example, so that it can be monitored from a remote position.

The network node thus receives the first field device data as data blocks and saves these data blocks in a list or a database, for example. The field device data is measurement data, for example. A user can request specific data blocks and sends digital monetary data for each of these data blocks and a public key in this request so that the network node can encrypt the requested data blocks. In principle, any paying user can use the digital monetary data to request data blocks of interest and pay for them with the request. Further verification of the user's authentication or identity can be carried out, but is not mandatory. This means that the data can be requested anonymously by any interested user and received in encrypted form, and the user pays for the data. A communication protocol can be implemented that provides for a prior query of existing data blocks and the price. However, this information can also be generally known.

The network node can be connected directly to the field device or via an intermediate device such as a router or other devices for data forwarding with or without protocol conversion. The data can also be transferred from the field device to the network node via a process control system or a measurement server, for example.

In embodiments, the request includes a selective data block request, i.e. a request for individual and individually identifiable data blocks, so that the request therefore includes a selection from the entirety of available data blocks. The selection can also be the entirety of available data blocks. The data blocks can, for example, be sent to the user once or distributed over a period of time.

The network node is different from the field device and is not a field device itself. The network node is, for example, a data device in the data network that has one or more processors, e.g. equipped with an operating system, a data memory and/or a database as well as interfaces and circuits for communication with the field device and also for communication with a user device, e.g. a user who wishes to acquire data from the operator or owner of the field devices. The network node can, for example, be a data device in the cloud and be connected to other network nodes. Examples of such a network node are a computer, a mobile device, a laptop, a tablet, etc.

The interface between the field device and the network node can be a digital interface or an analog interface, for example. For example, the interface is a fieldbus interface, an Ethernet or EtherCAT (Ethernet for Control Automation Technology) interface, a wireless interface such as WLAN (Wireless Local Area Network) or Bluetooth, a mobile radio interface to a 3G (Third Generation), 4G (Fourth Generation), 5G (Fifth Generation), LTE (Long-Term Evolution) network, a LoRa (Long Rang) interface, a HART (Highway Addressable Remote Transducer) interface or any other interface known to the skilled person.

The data blocks are therefore not stored in one or more field devices, but in the network node that receives the request and responds by sending the requested data blocks. The user has no access to the network node and therefore no access to the data blocks. The user can therefore not actively retrieve the data blocks from the network node, but they are sent to him. The network node, which is also responsible for encryption, is therefore responsible for sending. This means that the field device data in the data blocks is stored securely in the network node and, thanks to encryption with the user's public key, which is also sent in the request, is only accessible to the user without having access to the network node. Access management is therefore not required, which increases security.

With the request and the sending of the digital monetary data contained therein, a contract is automatically concluded upon successful verification. The name of the buyer, e.g. a company, an authority or a person, does not have to be known.

Digital monetary data is, for example, cryptocurrency data, which allows the buyer to remain anonymous. However, digital monetary data can also be understood as a classic digital bank transfer, where the sender data and bank details are visible.

The network node is therefore configured to be the data recipient and data source of field device data and to perform automated management tasks at the same time.

In summary, it is emphasized at this point that the contract, e.g. an intelligent contract or smart contract, is concluded solely by means of the request to the network node, the data blocks are requested and the public key is sent to the network node so that the data encrypted with the public key is sent in a response. The data is sent without any further action on the part of the user. Apart from the provision of the original field device data, network devices for communication such as devices for data forwarding and possibly blockchain devices, no other device is involved in the entire process. In particular, no other point in the network and no other connection to user or contract management is involved.

According to one embodiment, the network node is a network node of a blockchain network and stores the data blocks in the blockchain in encrypted form.

The blockchain allows the encrypted, decentralized storage of field device data in data blocks, e.g. in a list. This means that the network node is representative of any network node in the blockchain network.

According to one embodiment, the network node is configured to receive second field device data for identifying the first field device data stored in the blocks and to store the second field device data unencrypted with the first field device data, and wherein the second field device data is publicly visible for generating a data block request.

The second field device data for identifying the first field device data stored in the blocks can, for example, be data for identifying a measurement, a measuring point and/or a time stamp that the field device sends to the network node. Furthermore, the data can optionally contain additional data that defines the price. This information allows a user to select the desired data blocks and send the corresponding amount of money. The data or existing data blocks can either be queried before submitting the request and requested in the request, or can be requested in advance. In this case, the network node sends the corresponding first field device data as soon as it has received it from the field device and saved it as data blocks.

To select the data blocks, they can be assigned an ID by the network node so that the user device sends this ID in the request. The ID can also be a hash value from the second field device data, for example.

According to one embodiment, the data block request is a blockchain transaction containing an amount of money and the public key.

This means that the monetary data is transaction data from the blockchain. The transaction can be a cryptocurrency transaction, for example. The amount of money can therefore be sent to the network node completely anonymously. The network node can also forward the monetary data as a blockchain transaction to a recipient, e.g. the operator of the field device.

According to one embodiment, the network node is further configured to check an amount of money contained in the digital monetary data and, only if the amount of money is correct, to encrypt the requested stored data block using the received public key and transmit requested stored data block, wherein, in the event that the data block is stored in encrypted form in the blockchain, the network node is configured to first decrypt the requested data block and then to encrypt the decrypted data block using the received public key and transmit it in response to the data block request.

The amount of money contained in the received monetary data is compared with the amount of money to be paid for the data block in the network node. The data block is only released for decryption and transmission to the user device if it matches. The amount of money can also be zero, so that the data is freely available, although the authorization of the user or user device may be checked. Data blocks for which no amount of money is required can also be stored unencrypted in the blockchain.

According to one embodiment, the network node is also configured to receive and check authentication data with the data block request, and to encrypt the data block using the public key and transmit the data block only if authentication is successful.

To check the authorization, an authentication mechanism can be implemented in which the user device sends data for authentication. Public key authentication can be used here, for example, so that the public key represents the authentication data and no additional authentication data needs to be generated and transmitted.

According to one embodiment, the network node is further configured to encrypt a plurality of data blocks in the blockchain and not to encrypt a plurality of data blocks in the blockchain, whereby the amount of money is only checked for the data blocks encrypted in the blockchain.

Compared to the variant with unencrypted data blocks described above, this embodiment does not require verification. For example, a user device can log in and automatically receive all unencrypted or all previously unencrypted data blocks, e.g. according to a rule such as frequency, time period or measuring device.

According to one embodiment, the network node is further configured to receive a data block request from one user or multiple data block requests for the same data block from multiple users.

The same data block can be requested by one or more users and sent to them. It is therefore possible to sell the data provided multiple times.

According to one embodiment, the network node also has a computing unit on which a smart contract performs at least the storage of the data blocks, the verification of the amount of money, the decryption of the stored data blocks in the blockchain and the encryption of the requested data blocks.

A smart contract is an autonomous program running in a blockchain (e.g. Ethereum) that can securely execute defined functions and workflows. Such a program can be used to accept data or payments per transaction and execute functions based on them (e.g. executing a data transfer). A smart contract is "installed" once and runs completely autonomously from this point on. In addition, smart contracts do not work with external data sources, but only on the basis of information within their own blockchain and are therefore tamper-proof. The network node therefore represents any network node in the blockchain network on which the smart contract code is executed.

According to a further aspect, there is provided a field device data network comprising a network node described herein, a field device, and a user device, wherein the field device is configured to transmit first field device data to the network node. The user device is configured to transmit a data block request to the network node and to receive in response a requested data block encrypted using a public key of the user device, and to decrypt the received data block using the private key of the user device.

The field device can also be configured to transmit the second field device data described above to the network node.

According to one embodiment, the user device is further configured to query second field device data from the network node and to generate a data block request based on the queried second field device data and transmit it to the network node.

According to one embodiment, the user device is also configured to receive a requested data block and decrypt it using a private key.

According to a further aspect, a user device is provided for a field device data network described herein.

According to a further aspect, a method for transmitting a data block with field device data is provided, comprising the following steps in a network node:

Receiving first field device data, storing the first field device data in data blocks, receiving a data block request including a public key and digital monetary data, checking the digital monetary data, and if the digital monetary data is successfully checked, encrypting the requested data block using the public key and transmitting the data block encrypted using the public key.

According to a further aspect, a use of a network node described herein is provided for a field device data network described herein. In particular, the network node may be a network node of a blockchain on which a smart contract is executed.

The invention described enables two-way anonymous trading of field device data, for example measured values such as fill level, pressure, temperature, flow rate, mass flow or diagnostic data from field devices, for example via a blockchain, whereby both the owner or operator of the field device and the buyers of the data can remain anonymous. The field device data can be sold to one or more users. The rules and contract terms can be hard-coded as program code without accessing variable, external configuration data. Once such a smart contract has been installed, the entire payment and data transfer process runs autonomously and securely via this smart contract. The smart contract allows autonomous transaction processes. Different usage models can also be implemented, such as subscriptions, exclusive use or multiple sales. The data can also be provided anonymously. This means that any operator of a field device in the network can offer field device data such as sensor data for sale, and therefore not just manufacturers. The data is stored in a decentralized and tamper-proof database, such as a blockchain.

The transmission to the user or user device is secure thanks to encrypted data transfer. Various license models are possible, such as a so-called “freemium” model, a subscription or exclusive use. The models are explained below in the description. The invention can be used, for example, for monitoring natural variables such as water levels, river levels, glacier developments, temperature, air pressure or for monitoring public containers such as, for example: Filling levels in road salt containers, mobile toilets, tank systems, waste containers, glass containers, used clothing containers. However, the possible applications are not limited to these examples. The invention does not only relate to public applications, but can be used for any field device applications. The above-mentioned areas of application are merely exemplary.

The smart contract and other functions can be implemented as computer program elements. The computer program elements can be part of a computer program, but it can also be a whole program by itself. For example, the computer program element can be used to update an existing computer program in order to arrive at the present invention.

The computer program is stored on a computer-readable medium. The computer-readable medium can be regarded as a storage medium, such as a USB stick, a CD, a DVD, a data storage device, a hard disk or any other medium on which a program element as described above can be located.

BRIEF DESCRIPTION OF THE FIGURES

In the following, embodiments of the invention are explained in more detail with reference to the schematic drawings, whereby.

EMBODIMENTS

Corresponding items are marked with the same reference signs in all figures.

Figure 1:
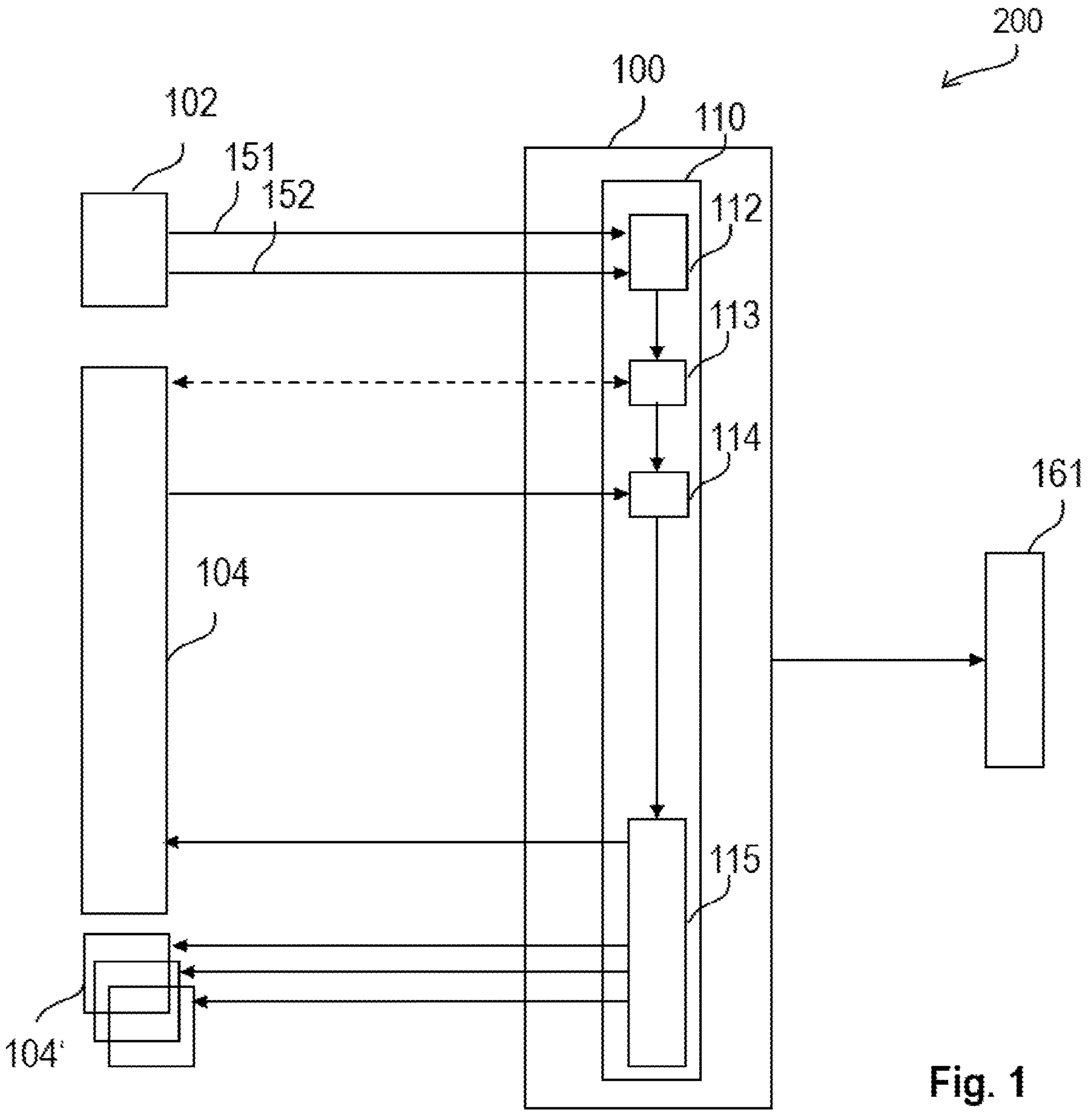
FIG. 1 shows a block diagram of a field device data network.

FIG. 1 shows a block diagram of a field device data network 200 with a network node 100 that is connected to a field device 102. The field device does not have to be directly connected to the network node 100, but can also be connected via other network elements, such as a router or communication devices of a mobile radio system, a wireless system, a wired data communication system, etc.

For example, the field device sends first field device data 151, such as measured values or a device status, and second field device data 152, such as an ID of the measurement and the measuring point, a time stamp, a measurement location, a measuring point name and optionally a price, to the network node 100.

The field device data network 200 is also connected to a user device 104, which, like the field device, can also be connected to the network node 100 via intermediate stations. The user device 104 can furthermore only be part of the field device data network 200 when the user device 104 connects to the network node 100. The network node 100 can, for example, be a network node of a blockchain network. Other user devices 104' can be connected to the network node 100. Furthermore, the block diagram shows a further network node 161 to which the network node 100 can send blockchain transactions.

To illustrate the functions, various functional units 112 . . . 115 are shown in the block diagram for the network node 100, which are part of the smart contract 110. For example, the unit 112 shows a receiving unit and encoding unit 112 that receives at least part of the data that the field device 102 sends to the network node 100, encodes it and stores it in a memory 113 or a database 113 as a blockchain list. The user device 104 can query entries in the blockchain list in the database 113, and query the unencrypted information such as ID of the measurement, price, etc., so that it can make targeted purchases relating to one or more data blocks by making corresponding requests. For this purpose, the user device 104 sends monetary data and, for example, an ID of the data block, the measurement, etc. in the form of a blockchain transaction to the network node, which in the functional unit 114 performs checks regarding the amount of money shown in the transaction, the existence of the requested measurement, possibly the authenticity of the user device, etc., and decodes the data blocks according to the result of the check and sends them to the encoder 115, which encodes the data blocks with a private key of the user device 104 or the user and sends them to the user device 104 and/or other user devices 104'. At the same time, the network node 100 sends the amount of money through a blockchain transaction 160 to, for example, the other blockchain network node 161 or to the operator of the field device 102, so that the latter comes into possession of the amount of money.

Figure 2:
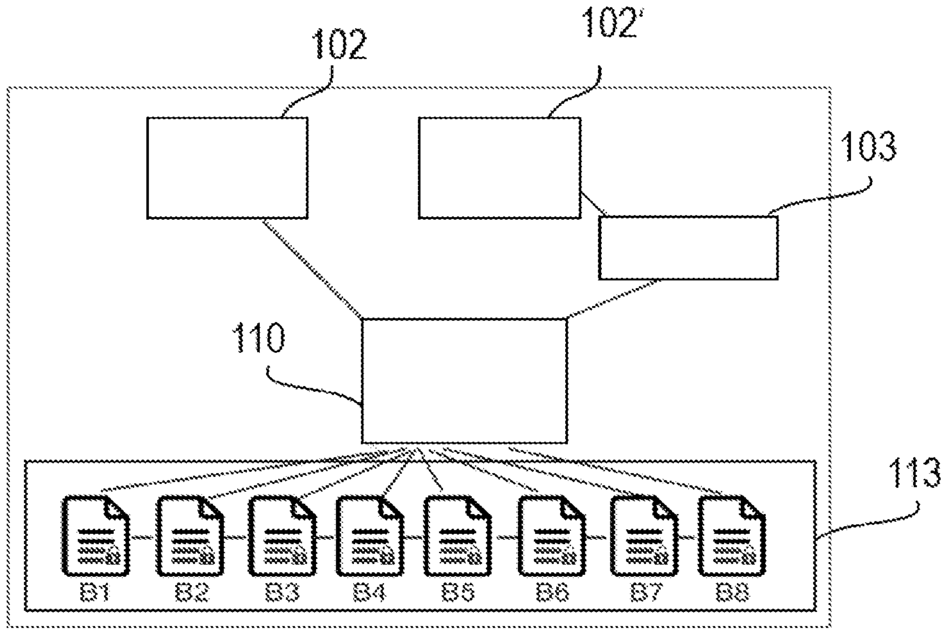
FIG. 2 shows a diagram explaining the storage of data blocks.
Figure 3:
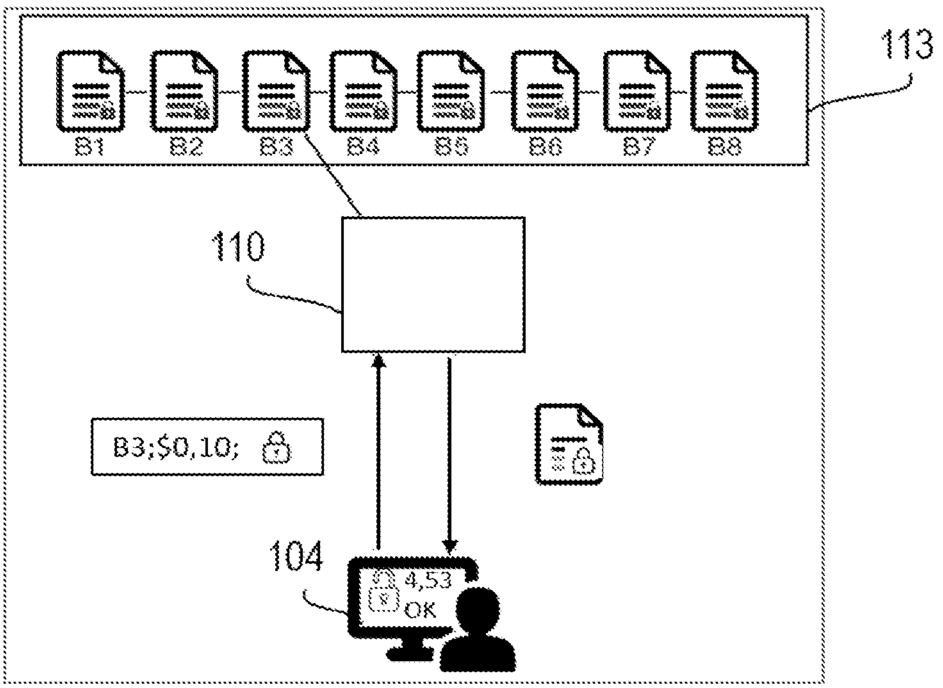
FIG. 3 shows a diagram explaining the retrieval of data blocks.

FIGS. 2 and 3 illustrate individual processes in more detail.

FIG. 2 shows a block diagram with two field devices 102, 102', where the second field device 102' is connected to the smart contract 110 via a router 103. The smart contract 110 stores the data received from the field devices 102, 102' as individual blocks (B1-B8) in the database 113 of the blockchain, whereby the chargeable part of the data is encrypted.

FIG. 3 shows a block diagram with a user 300 and a user device 104. The user device 104 sends a data block request 301 for a data block (B3) with a purchase price and its own public key. The smart contract 110 retrieves the data from the blockchain 302 and validates the purchase price. The smart contract 110 encrypts the data block with the public key of the user 102 and sends 303 the encrypted data block to the user device 104. The user device 104 receives the data block B3 and can decrypt it with its own private key 304 and thus has access to the data.

Figure 4:
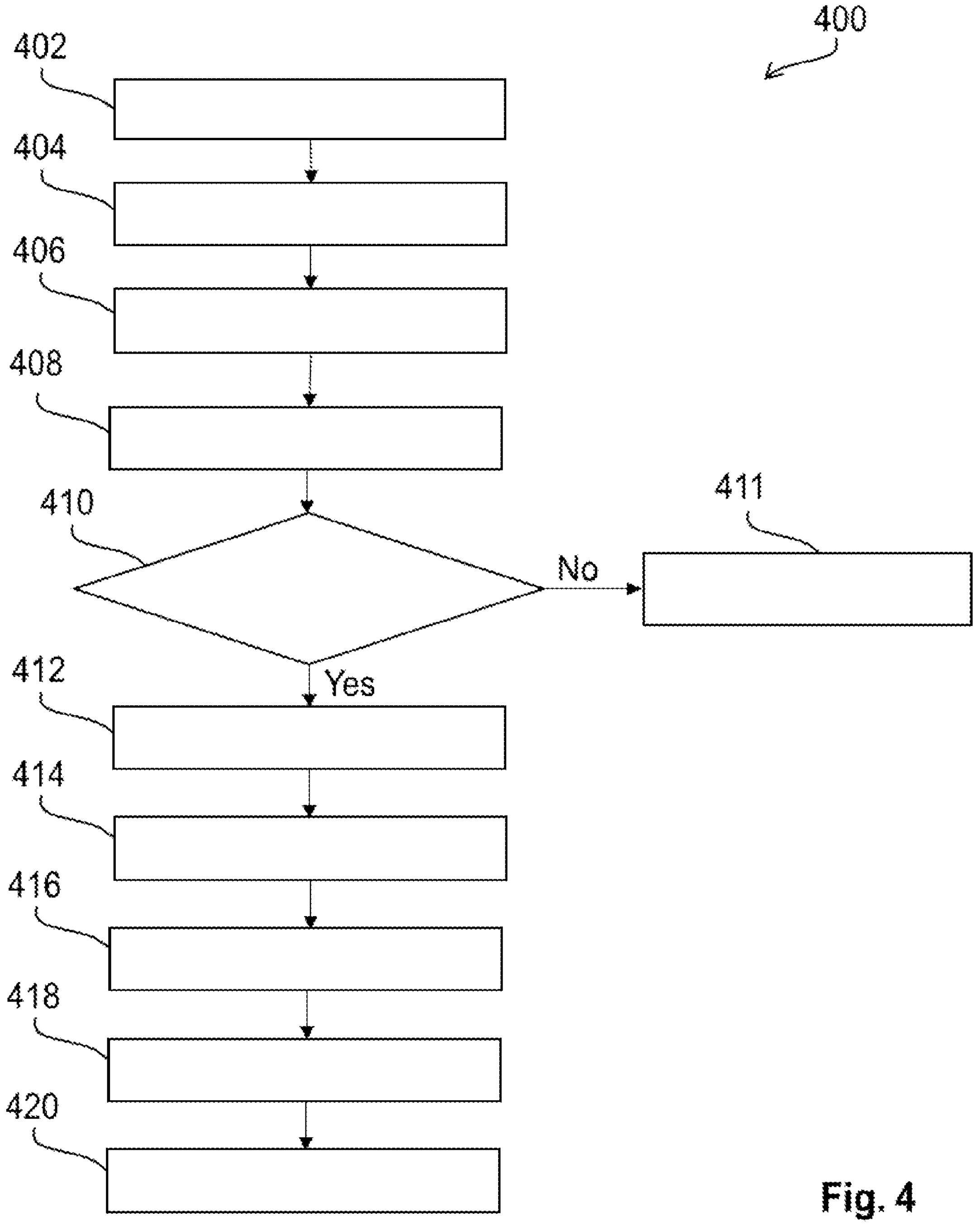
FIG. 4 shows a flow chart of a procedure for transmitting a data block with field device data.

FIG. 4. shows a flow diagram of the method 400 for transmitting a data block with field device data.

In a first step 402, first and second field device data are provided by a field device 102 and sent to a blockchain in a network node. In a second step 404, the network node receives the first and second field device data and stores it as a list in a database in the blockchain in a third step 406. The first field device data is payable data and is encrypted by the smart contract 110, a program running on the blockchain. The required price can also be stored for each data block. Alternatively, this can generally be stored for all data blocks in the smart contract. To purchase a data block, an interested party transfers the purchase price stored in the data block or smart contract together with the ID of the data block or data package to the smart contract via a blockchain transaction. This transaction with the aforementioned data is received by the network node 100 in step 408. In step 410, the network node 100 or the smart contract in the network node checks whether the amount corresponds to the purchase price and, if necessary, for example, whether the address of the buyer is authorized for the purchase. If one of the requirements is not met, the transaction is rejected in step 411. If all requirements are met, the smart contract decrypts the data block in step 412 and encrypts it again with the buyer's public key in step 414 in order to send it to the buyer's address in step 416. The purchase price of the data sent to the smart contract is then also sent to the data provider via blockchain transaction in step 418. This step can also take place elsewhere. After a successful transaction, the buyer can decrypt the data block received in step 420 using their private key and has access to the data it contains. Steps 404 to 416 are carried out in the network node 100.

Different models that can be implemented in the smart contract are described below.

Multiple sales: Since only the buyer can decrypt and view the received data from the blockchain, existing data packages can be sold to different users as often as required.

"Freemium model": Instead of encrypting every block of data, it could be stored unencrypted in the blockchain at a certain frequency (e.g. every 100th packet). This would give interested parties the opportunity to view a small part of the data collected without having to pay for it. Only if an interested party wants a higher quality/frequency can this be achieved by paying for the remaining data.

"Exclusive use": A data block or data package is only sold once or in limited quantities. For example, an "exclusive purchase price" can be stored in the smart contract for this purpose. As soon as this has been paid by one or the maximum number of interested parties, the data package can no longer be transferred to other interested parties. All further transactions for this package would then be rejected.

"Subscription model": A smart contract can be implemented in such a way that it supports the payment and transmission of several data packets at once, for example. The requested data packets can either already exist or be generated in the future. For example, users could take out a subscription for a fixed period or a fixed number and frequency of data packets. For example, the purchase price x number of desired data packages would have to be paid in advance. By specifying the frequency (e.g. every 2nd or 10th data packet or one packet per hour or day), the smart contract can then automatically transmit the desired packets until the stored credit is used up. To protect the credit (e.g. if no more new data is generated), a cancelation option or a maximum contract term could be implemented, which transfers the remaining credit back to the subscriber.

Other variations of the disclosed embodiments may be understood and carried out by one skilled in the art in practicing the claimed invention by studying the drawings, the disclosure and the appended claims. In the claims, the word "comprising" does not exclude other elements or steps, and the indefinite article "one" or "a" does not exclude a plurality. A single processor or other unit may perform the functions of multiple items or steps recited in the claims. The mere fact that certain actions are recited in interdependent claims does not mean that a combination of those actions cannot be used advantageously. A computer program may be stored/distributed on a suitable medium such as an optical storage medium or a semiconductor medium supplied together with or as part of other hardware, but may also be distributed in other forms, for example via the Internet or other wired or wireless telecommunication systems. Reference signs in the claims should not be construed to limit the scope of the claims.

The invention claimed is:

1. A network node for a field device data network, comprising:

circuitry configured to:

receive first field device data;

store the first field device data in data blocks;

receive a data block request from a user device, the data block request including a public key and digital monetary data, wherein the user device is not required to be a predefined party in the network;

check the digital monetary data; and when the check is successful, answer the data block request by encrypting the requested data block directly with the public key received in the data block request, without use of a proxy re-encryption key, and by transmitting the data block encrypted using the public key.

2. The network node according to claim 1, wherein the network node is a network node of a blockchain network and stores the data blocks in the blockchain in encrypted form.

3. The network node according to claim 2, wherein the circuitry is further configured to receive second field device data for identifying the first field device data stored in the blocks and to store the second field device data unencrypted with the first field device data, and wherein the second field device data is publicly visible for generating a data block request.

4. The network node according to claim 3, wherein the data block request is a blockchain transaction containing an amount of money and the public key.

5. The network node according to claim 2, wherein the circuitry is further configured to check an amount of money contained in the digital monetary data and to encrypt the stored data block using the public key and transmit requested stored data block only if the amount of money is correct, wherein, in an event that the data block is stored in encrypted form in the blockchain, the circuitry is further configured to first decrypt the requested data block and then to encrypt the decrypted data block using the public key and transmit the decrypted data block in response to the data block request.

6. The network node according to claim 1, wherein the circuitry is further configured to receive second field device data for identifying the first field device data stored in the blocks and to store the second field device data unencrypted with the first field device data, and wherein the second field device data is publicly visible for generating a data block request.

7. The network node according to claim 6, wherein the data block request is a blockchain transaction containing an amount of money and the public key.

8. The network node according to claim 7, wherein the circuitry is further configured to check an amount of money contained in the digital monetary data and to encrypt the stored data block using the public key and transmit requested stored data block only if the amount of money is correct, wherein, in an event that the data block is stored in encrypted form in the blockchain, the circuitry is further configured to first decrypt the requested data block and then to encrypt the decrypted data block using the public key and transmit the decrypted data block in response to the data block request.

9. The network node according to claim 6, wherein the circuitry is further configured to check an amount of money contained in the digital monetary data and to encrypt the stored data block using the public key and transmit requested stored data block only if the amount of money is correct, wherein, in an event that the data block is stored in encrypted form in a blockchain, the circuitry is further configured to first decrypt the requested data block and then to encrypt the decrypted data block using the public key and transmit the decrypted data block in response to the data block request.

10. The network node according to claim 1, wherein the circuitry is further configured to check an amount of money contained in the digital monetary data and to encrypt the data block using the public key and transmit requested stored data block only if the amount of money is correct, wherein, in an event that the data block is stored in encrypted form in a blockchain, the circuitry is further configured to first decrypt the requested data block and then to encrypt the decrypted data block using the public key and transmit the decrypted data block in response to the data block request.

11. The network node according to claim 10, wherein the circuitry is further configured to receive and check authentication data with the data block request and to encrypt and transmit the data block using the public key only if authentication is successful.

12. The network node according to claim 1, wherein the circuitry is further configured to encrypt a plurality of data blocks in a blockchain and not to encrypt a plurality of data blocks in the blockchain, and wherein the digital money amount is checked only for the data blocks encrypted in the blockchain.

13. The network node according to claim 1, wherein the circuitry is further configured to receive a data block request from one user or multiple data block requests for the same data block from multiple users.

14. The network node according to claim 1, wherein the circuitry further comprises computing circuitry configured to execute a smart contract, and wherein the smart contract performs at least storing the data blocks, verifying the digital money amount, decrypting the stored data blocks in a blockchain and encrypting the requested data blocks.

15. A field device data network, comprising:

a network node including circuitry configured to:

receive first field device data, store the first field device data in data blocks, receive a data block request from a user device, the data block request including a public key and digital monetary data, wherein the user device is not required to be a predefined party in the network, check the digital monetary data, and when the check is successful, answer the data block request by encrypting the requested data block directly with the public key received in the data block request, without use of a proxy re-encryption key, and by transmitting the data block encrypted using the public key;

a field device; and a user device, wherein the field device includes second circuitry configured to transmit first field device data and second field device data to the network node, and the user device includes third circuitry configured to transmit a data block request to the network node and to receive in response a requested data block encrypted using the public key of the user device, and to decrypt the received data block encrypted a private key of the user device.

16. The field device data network according to claim 15, wherein the third circuitry of the user device is further configured to query second field device data from the network node, and to generate a data block request based on the queried second field device data and to transmit the data block request to the network node.

17. The field device data network according to claim 15, wherein third circuitry of the user device is further configured to receive a requested data block and to decrypt it using a private key.

18. A method for transmitting a data block with field device data, comprising, in a network node:

receiving first field device data;

storing the first field device data in data blocks;

receiving a data block request from a user device, the data block request including a public key and digital monetary data, wherein the user device is not required to be a predefined party in the network;

checking the digital monetary data;

encrypting the data block directly with the public key received in the data block request, without use of a proxy re-encryption key, upon successful check of the digital monetary data; and transmitting the data block encrypted using the public key.

* * * * *